US010958445B1

United States Patent
Auch et al.

(10) Patent No.: US 10,958,445 B1
(45) Date of Patent: Mar. 23, 2021

(54) ATTRIBUTION OF NETWORK EVENTS PURSUANT TO CONFIGURING MOBILE COMMUNICATION DEVICES

(71) Applicant: Sprint Communications Company L.P., Overland Park, KS (US)

(72) Inventors: Jonathan P. Auch, Shawnee, KS (US); Paul M. Day, Oak Grove, MO (US); Matthew Habiger, Kansas City, KS (US); Jared K. Harpole, Overland Park, KS (US); Dillion M. Hughes, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 192 days.

(21) Appl. No.: 15/867,698

(22) Filed: Jan. 11, 2018

(51) Int. Cl.
*H04L 29/06* (2006.01)
*H04L 9/32* (2006.01)
*H04W 8/18* (2009.01)

(52) U.S. Cl.
CPC ........ *H04L 9/3263* (2013.01); *H04L 63/0428* (2013.01); *H04W 8/18* (2013.01)

(58) Field of Classification Search
CPC ..... H04L 9/3263; H04L 63/0428; H04W 8/18
See application file for complete search history.

(56) References Cited

U.S. PATENT DOCUMENTS

| | | | | |
|---|---|---|---|---|
| 5,948,061 A * | 9/1999 | Merriman | ............... | G06Q 30/02 705/14.53 |
| 6,341,305 B2 * | 1/2002 | Wolfe | ............... | H04L 67/20 709/203 |
| 6,487,538 B1 * | 11/2002 | Gupta | ............... | G06Q 30/02 705/14.66 |
| 6,505,169 B1 * | 1/2003 | Bhagavath | ............. | G06Q 30/02 705/14.66 |
| 2004/0078564 A1 * | 4/2004 | Abdulhayoglu | ...... | H04L 63/123 713/156 |
| 2004/0243466 A1 * | 12/2004 | Trzybinski | ............. | G06Q 30/02 705/14.55 |
| 2011/0154305 A1 * | 6/2011 | LeRoux | ................... | G06F 8/71 717/140 |
| 2015/0081617 A1 * | 3/2015 | Shaik | ................. | G06Q 30/0241 707/602 |
| 2015/0112767 A1 * | 4/2015 | Shatzkamer | ....... | G06Q 30/0205 705/7.34 |
| 2019/0258781 A1 * | 8/2019 | Qureshi | .................. | G06F 21/12 |

* cited by examiner

*Primary Examiner* — Tongoc Tran (57) ABSTRACT

A telecommunications service provider network gateway computer system. The gateway computer comprises a processor, a non-transitory memory, and a probe application stored in the non-transitory memory. When executed by the processor, the probe application monitors data packets received from a radio access network (RAN), identifies data packets addressed to a server computer hosting a mobile application downloading site, for the data packets addressed to the downloading site, collect information associated with telecommunications service subscribers downloading applications from the downloading site based on a telecommunications service subscriber identity associated with each of the data packets provided to the gateway server computer by the RAN, generates a report based on the information collected that anonymizes the subscribers' identities, and transmits the report to an operator of the downloading site. The gateway computer system transmits the data packets received from the RAN on to destination hosts identified in the data packets.

10 Claims, 3 Drawing Sheets

ATTRIBUTION OF NETWORK EVENTS PURSUANT TO CONFIGURING MOBILE COMMUNICATION DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices and the applications installed on these mobile communication devices are very widely used in the United States. These mobile communication applications provide voice communication and data communication services. Many mobile communication devices support downloading and installing mobile applications, such as gaming applications, special interest applications, streaming media applications, and other applications.

SUMMARY

In an embodiment, a telecommunications service provider network gateway computer system is disclosed. The gateway computer system comprises a processor, a non-transitory memory, and a probe application stored in the non-transitory memory. When executed by the processor, the probe application monitors data packets received from a radio access network (RAN) and identifies data packets addressed to a server computer hosting a mobile application downloading site by parsing an address of the server computer hosting the downloading site from the data packets and by finding the address of the server computer in a list of addresses of server computers hosting mobile application downloading sites. The probe application further, for the data packets addressed to the downloading site, collects information associated with telecommunications service subscribers downloading applications from the downloading site based on a telecommunications service subscriber identity associated with each of the data packets provided to the gateway server computer by the RAN, generates a report based on the information collected that anonymizes the subscribers' identities, and transmits the report to an operator of the downloading site. The gateway computer system transmits the data packets received from the RAN to destination hosts identified in the data packets.

In another embodiment, a method of reporting mobile application downloading information is disclosed. The method comprises monitoring data packets received from a radio access network (RAN) by a probe application executing on a telecommunications service provider gateway, identifying hypertext transport protocol secure (HTTPS) packets among the monitored data packets that are addressed to a server computer hosting a mobile application downloading site by the probe application, and decrypting the HTTPS packets based on a secure socket layer (SSL) certificate stored at the gateway. The method further comprises, for the HTTPS packets, collecting by the probe application information associated with telecommunications service subscribers downloading applications from the downloading site based on a telecommunications service subscriber identity associated with each of the data packets provided to the gateway server computer by the RAN, generating a report based on the information collected that anonymizes the subscribers' identities, transmitting the report to an operator of the downloading site, and transmitting by the gateway the data packets received from the RAN on to destination hosts identified in the data packets.

In yet another embodiment, a method of reporting mobile application downloading information is disclosed. The method comprises monitoring data packets received from a radio access network (RAN) by a probe application executing on a telecommunications service provider gateway and identifying data packets addressed to a server computer hosting a mobile application downloading site by the probe application. The method further comprises, for the data packets addressed to the downloading site, collecting by the probe application information associated with telecommunications service subscribers downloading applications from the downloading site based on a telecommunications service subscriber identity associated with each of the data packets provided to the gateway server computer by the RAN, generating a report based on the information collected that anonymizes the subscribers' identities, transmitting the report an operator of the downloading site, and transmitting by the gateway the data packets received from the RAN on to destination hosts identified in the data packets.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods for monitoring communication network events, inferring from the network events a mobile application download to a mobile communication device, collecting information about those downloads, and distributing information about those downloads to various parties. In many current systems, mobile application distributors may be integrated into specific distribution frameworks or application stores, and it is only through the services of that distribution framework that mobile application developers know when their applications have been downloaded and installed. The proprietor of the distribution framework may not provide extensive information about the subscribers who download the mobile application. The mobile application distributors and the wireless service providers may be undesirably controlled, in some sense, by the proprietor of the distribution framework. The mobile application developers may feel constrained by requirements of integrating with the distribution frameworks, either with reference to schedule constraints imposed by the distribution framework or technical requirements or design protocols. The information technology solution taught herein opens up this prior technology model and frees, at least to some extent, the mobile application distributors and the wireless communication service providers to operate more entrepreneurially and obtain fuller information about public response to the mobile applications.

The information collected from monitoring communication network events may be analyzed to generate reports on profiles of individuals who download and install specific mobile applications which may be useful to the developer of the specific mobile application. The collected information may be analyzed to generate reports for a web site that hosts multiple mobile applications for downloading. The collected information may be analyzed to develop attribution for advertisers so they can claim a share of revenue from the downloading of a mobile application resulting from their advertisement. By developing the information described above from monitoring network events and analyzing those events, it may be possible to incorporate more mobile application distribution web sites into a wireless service provider's system. Said in other words, a wireless service provider may be able to engage with more mobile application distribution web sites, thereby increasing the diversity of mobile application sources available to wireless communication service subscribers of the wireless service provider, using the system and methods taught herein.

A probe application executes on a gateway computer system in a wireless communication service provider's network. The gateway computer system mediates between a radio access network (RAN) that uses telecommunications wireless protocols such as long term evolution (LTE) and a core network, for example a data network that uses data communication protocols such as Internet Protocol (IP) and transport control protocol (TCP). The probe application monitors messages passing from the RAN to the core network and identifies packets addressed to a known set of systems, for example based on a domain name of the systems or based on an address (e.g., IP address) of the systems that is included in the message. The probe application may parse the messages to read the domain name and/or address of the destination of the messages. The probe application may use a white list of computers that are known to host a mobile application distribution system. The white list may be configured into the probe application or the probe application may access the white list from a memory of the gateway computer system or from an external data store. When the probe application determines that a message from the RAN to the core network is addressed to a mobile application distribution system, it identifies a mobile subscriber associated with the mobile communication device that originated the message. The probe application may further determine what specific mobile application may be requested for download in the message, for example by reading the content of the message when the message is transmitted unencrypted. Alternatively, the probe application may store a secure socket layer (SSL) certificate for some mobile application distribution systems, use those SSL certificates to decrypt encrypted messages, read the content of the message, and determine the specific mobile application requested for download.

The probe application accesses profile and demographic information about the subscriber and stores this information associated to the subject mobile application distribution system. The probe application processes the associations of accesses to mobile application distribution systems to subscriber profile and demographic information to generate a report for promulgation to one or more mobile application distribution systems. This information may help the mobile application distribution systems to identify the characteristics of who downloads applications from their site and to thereby adapt their system and offerings. The probe application may further generate reports for specific mobile applications or for a developer of a plurality of mobile applications from the collected information, in cases where the downloaded mobile applications may have been determined. Likewise, these reports can help the developer of mobile applications to identify the characteristics of who downloads their applications and thereby to adapt other mobile applications they may develop. Different reports may be generated by the probe directed to different audiences, where each report derives from the information collected that pertains to each audience.

In some cases the probe application may determine that a mobile application is being downloaded based on a sequence of web sites visited by the same subscriber. Thus, if the subscriber first visits web site A, then second visits web site B, and visits web site C after visiting web site B, the probe application may infer that the subscriber is downloading a mobile application from web site C. This kind of inference can be made based on inference rules learned by the probe application through a kind of training mode of operation. This information can further be used to infer that the downloading from web site C may be attributed to a mobile advertisement received from web site B.

Figure 1:
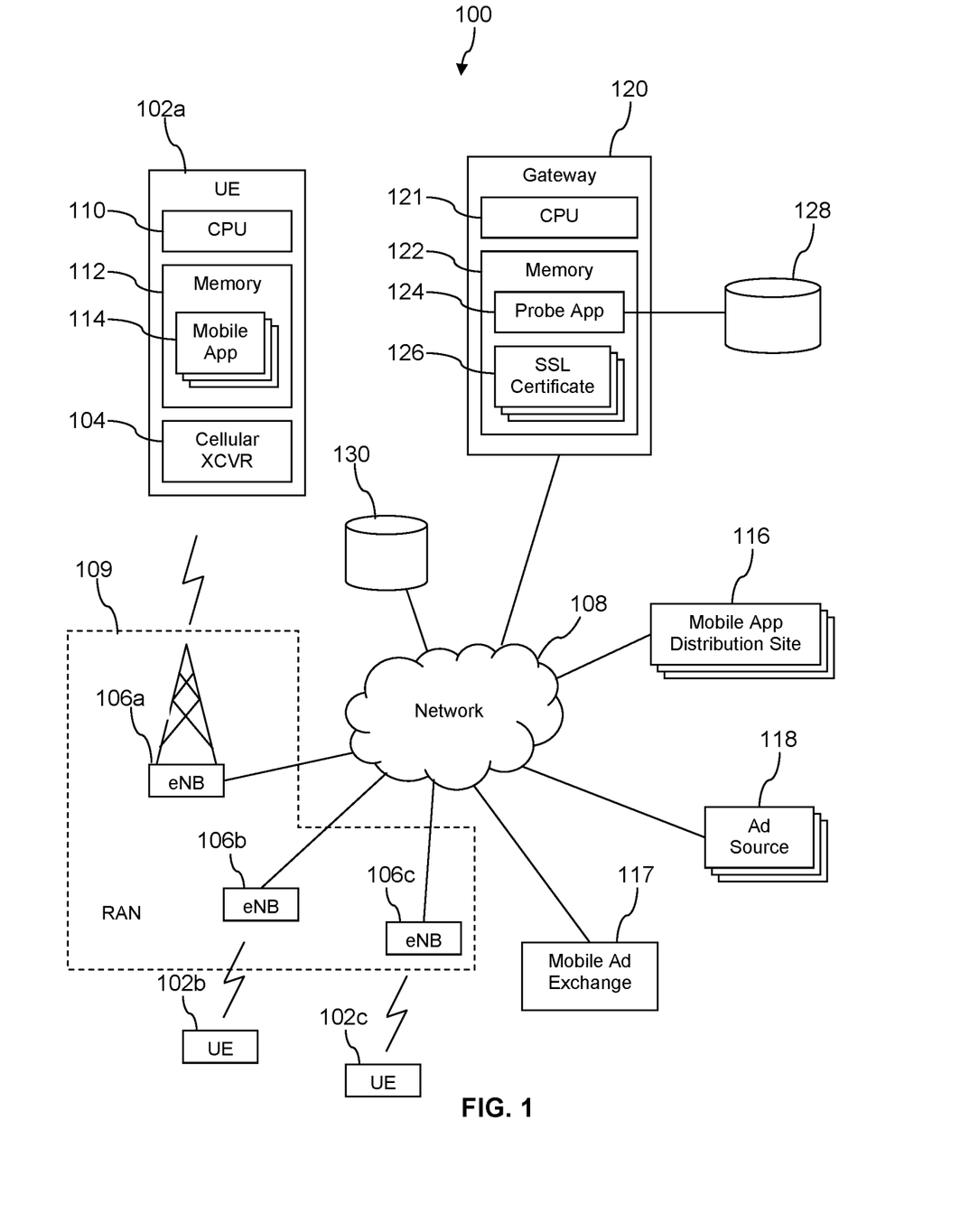
FIG. 1 is a block diagram of a communication system according to an embodiment of the disclosure.

Turning now to FIG. 1, a communication system 100 is described. In an embodiment, the system 100 comprises a plurality of mobile communication devices 102 (user equipment—UE), for example a first device 102a, a second device 102b, and a third device 102c. The mobile communication devices 102 communicate via a cellular radio transceiver 104 that may establish a wireless communication link with a cell site 106, for example a first cell site 106a, a second cell site 106b, or a third cell site 106c. The mobile communication device 102 may communicate with the cell site 106 according to a long term evolution (LTE), a code division multiple access (CDMA), a global system for mobile communications (GSM), or a worldwide interoperability for microwave access (WiMAX) telecommunications wireless protocol. The cell site 106 may communicatively couple the device 102 to a network 108. While three mobile communication devices 102 and three cells sites 106 are illustrated in FIG. 1, it is understood that system 100 may comprise any number of devices 102 and any number of cell sites 106. The network 108 comprises one or more public networks, one or more private networks, or a combination thereof.

The cell sites 106 may be said to constitute, in part, a radio access network (RAN) 109. Communications between the mobile communication devices 102 and the cell sites 106 and from the cell sites to the network 108 may be said to take place in accordance with wireless communication protocols, such as LTE, CDMA, GSM, or WiMax. A gateway computer system 120 may mediate communications according to wireless communication protocols to a data communication protocol that may be used for communications within a core of the network 108 (e.g., the core network). The gateway computer system 120 may be considered to be a part of the network 108 but is illustrated outside of the network 108 to promote discussing separately and describing some details of the gateway 120 further. The gateway 120 may be implemented as a computer system, and computer systems are discussed further hereinafter.

The mobile communication device 102 comprises a processor 110 and a memory 112. The memory 112 may store one or more mobile applications 114. The mobile applications 114 may be executed by the processor 110 to perform various functions. The mobile applications 114 may be distinguished from applications installed by the original equipment manufacturer (OEM) such as a dialer application, an email application, a texting application, and other common smart phone applications. At least some of the mobile applications 114 may be downloaded from one or more mobile application distribution web sites 116. A user of the mobile communication device 102 may execute one of the mobile applications 114 that embeds a software development kit (SDK) or instructions embedded in the mobile application 114 during building of the application using the SDK. This SDK and/or imbedded instructions may request an advertisement from a mobile ad exchange 117 that forwards an ad request on to a plurality of ad sources 118. The ad sources 118 may submit bids to present an ad within the mobile application 114 executing on the device 102. The mobile ad exchange 117 may choose one of the bids and send associated ad content to the mobile application 114. The mobile application 114 presents the ad content.

In some cases, the ad content may be an advertisement for a mobile application hosted by a mobile application distribution web site 116. A user of the mobile communication device 102 may click on the presentation of the ad in a display of the device 102, and this may result in a communication message being created by the mobile application 114, transmission of the message by the cellular radio transceiver 104 to the cell site 106, transmission of the message from the cell site 106 to the gateway computer system 120, transmission of the message from the gateway computer system 120 to the mobile application distribution web site 116. The message may comprise a domain name and/or address of the mobile application distribution web site 116. The message may further comprise the name or other identity or reference to the mobile application which the device 102 is requesting to be downloaded from the mobile application distribution web site 116. The gateway computer system 120 may transcode the message from a first communication protocol, for example from a wireless telecommunications protocol, to a second communication protocol, for example to a data communication protocol such as Internet protocol (IP), transport control protocol (TCP), or other data communication protocol.

The gateway computer system 120 further comprises a processor 121 and a memory 122. The memory 122 comprises a probe application 124 and optionally one or more stored secure socket layer (SSL) certificates 126. SSL certificates allow decrypting messages that have been encrypted by another system that has provided the SSL certificate, for example messages sent between the device 102 and the mobile application distribution web site 116 that may be sent using secure hypertext transport protocol (HTTPS). HTTPS encrypts the messages. The probe application 124 monitors messages that are passing from the RAN 109 via the gateway computer system 120 to the network 108. The probe application 124 reads the destination addresses of those messages, and when the destination address corresponds to the address of one of the mobile application distribution web sites 116 it stores information about that message, such as the address and/or identity of the mobile application distribution web site 116, an identity of the mobile communication device 102 or of a subscriber associated with the device 102, and possibly information about the content of the message such as an identity of a mobile application that may be in-process of being downloaded from the mobile application distribution web site 116. The probe application 124 may store this information in a data store 128. The probe application 124 may extend the information associated to the mobile communication device and to the mobile application distribution web site 116 by accessing profile and demographic information about the associated subscriber in a profile and demographic data store 130. The probe application 124, by reading the messages, may be said to parse the messages.

If the message from the mobile application 114 to the mobile application distribution web site 116 is encrypted, the probe application 124 may decrypt the message using a SSL certificate 126 that it may store. In some cases, the operator of the gateway computer system 120 (e.g., a wireless communication service provider) may have established a relationship with one or more of the mobile application distribution web sites 116 and have obtained the SSL certificate 126 that can be used to decrypt messages sent via secure hypertext transport protocol (HTTPS).

The probe application 124 may analyze the information it has stored in the data store 128, for example weekly, monthly, quarterly, or on some other periodic interval. Based on the analysis, the probe application 124 may create different reports for different audiences or for different parties to the communications within the system 100 described above. For example, the probe application 124 can make reports that are of interest to the mobile application distribution web sites 116. For example, all the information related to one of the mobile application distribution web sites 116 may be selected, statistics and counts of events related to that web site 116 may be aggregated, and a report made based on those counts and statistics that may be of interest to that web site 116. A separate report may be generated for each different mobile application distribution web site 116 and shared with those sites 116 or an owner. In another embodiment, a different application from the probe application 124 analyzes the collected information and generates the reports. This other analysis and report generation application may execute on the gateway computer system 120 or may execute on a computer system different from the gateway computer system 120.

The report may comprise a break-out of the statistics of subscribers using a given mobile application distribution web sites 116: a total number of subscribers who accessed the site 116 through the gateway 120, a distribution of those subscribers as to age category, a distribution of those subscribers as to income; a distribution of those subscribers as to educational level, a distribution of those subscribers as to location, and other information. From this report the mobile application distribution web sites 116 may learn that 85% of their distribution of web applications is completed with people aged 21 to 35 and that 55% of their distribution of web applications is completed to women and 45% to men. This kind of information can be valuable to such mobile application distribution web sites 116 in adapting their interfaces and selecting the mobile applications they choose to distribute.

The profile and demographic information about subscribers who accessed the mobile application distribution web sites 116 may be looked up by the probe application 124 at the time that the mobile communication device 102 accesses the sites 116 and then stored in the data store 128. Alternatively, the probe application 124 can look up the profile and demographic information about subscribers who accessed the mobile application distribution web sites 116 during the analysis process itself. The profile information may include information about behavior such as on-line purchases, mobile application usage patterns, travel patterns, and communication patterns. The demographic information may include information about age, gender, educational level, income level.

A report may also be generated for mobile application developers. For example, the probe application 124 (or in another embodiment a different application) may generate a report that selects all information associated with one or more mobile applications associated with the subject mobile application developer. A first mobile application associated with the developer may be hosted for distribution by a first distribution web site 116 and a second mobile application associated with the same developer may be hosted for distribution by a second distribution web site, hence the report for the developer would include information that relates to both of the first and second distribution web sites. This developer report may break down some of the statistics by different distribution web sites. The developer report may also report information on the distribution of profile and demographic characteristics of subscribers who have downloaded their applications.

Figure 2:
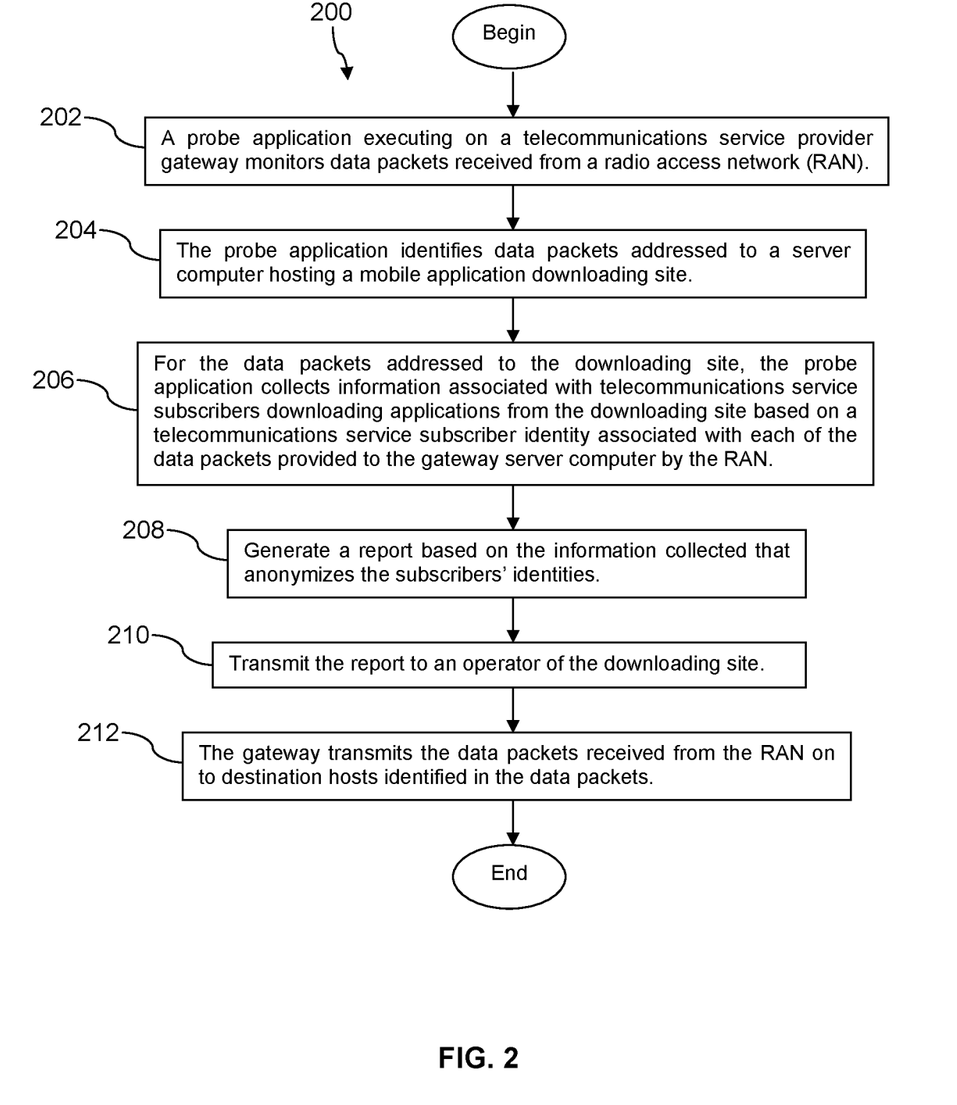
FIG. 2 is a flow chart of a method according to an embodiment of the disclosure.

Turning now to FIG. 2, a method 200 is described. At block 202, a probe application executing on a telecommunications service provider gateway monitors data packets received from a radio access network (RAN). At block 204, the probe application identifies data packets addressed to a server computer hosting a mobile application downloading site. At block 206, for the data packets addressed to the downloading site, the probe application collects information associated with telecommunications service subscribers downloading applications from the downloading site based on a telecommunications service subscriber identity associated with each of the data packets provided to the gateway server computer by the RAN.

At block 208, generate a report based on the information collected that anonymizes the subscribers' identities. For example, a different identifier may be associated with the telecommunication service subscriber that is not traceable by another (e.g., not by another that is not the telecommunications service provider), thereby cloaking the identity of the actual subscriber. There may be a one-to-one association of the subscriber to the anonymized identity. In an embodiment, the anonymized identity may be changed occasionally to further anonymize the identity of the subscriber. At block 210, transmit the report to an operator of the downloading site. The processing of blocks 208 and 210 may be performed by the probe application. Alternatively, the report may be generated and transmitted by a different application, executing on the gateway computer system 120 or executing on a different computer system, based on the information provided at least in part by the probe application. At block 212, the gateway computer system transmits the data packets received from the RAN on to destination hosts identified in the data packets.

Figure 3:
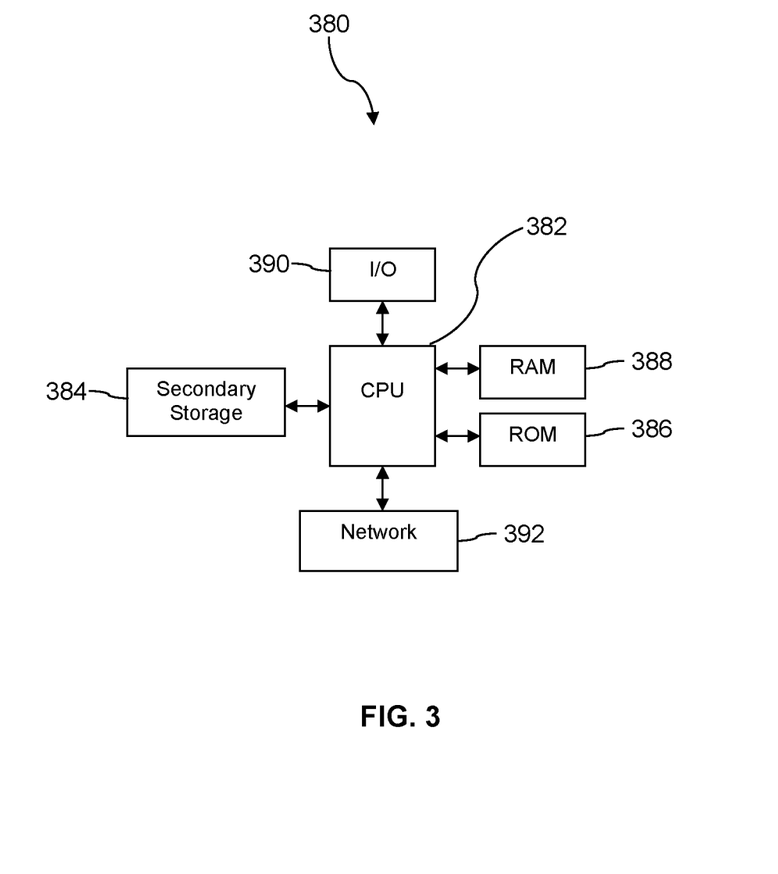
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for nonvolatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A telecommunications service provider network gateway computer system, comprising:
   a processor;
   a non-transitory memory; and
   a probe application stored in the non-transitory memory that, when executed by the processor:
   monitors data packets received from a radio access network (RAN),
   parses an address included in each of the data packets,
   determines whether the address included in each of the data packets matches an address of a server computer included on a white list of server computers hosting mobile application downloading sites,
   identifies data packets addressed to a server computer hosting a mobile application downloading site in response to determining that the address of the server computer is included on the white list,
   in response to determining that the address of the server computer is included on the white list:
      determines identities of telecommunication service subscribers associated with mobile communication devices that originated the data packets addressed to the server computer hosting the mobile application downloading site,
      determines identities of mobile applications being requested for download in the data packets by reading the content of the data packets,
      for the data packets addressed to the mobile application downloading site, collects information including the determined identities of the telecommunication service subscribers and the identities of the mobile applications being requested for download,
      accesses profile and demographic information about the telecommunications service subscribers from a profile and demographic data store based on the identities of the telecommunication service subscribers, and
      stores the information collected and the accessed profile and demographic information as associated to the mobile application downloading site in a data store,
   generates a first report based on the information collected and the accessed profile and demographic information that anonymizes the telecommunication service subscribers' identities, wherein the first report comprises information on a distribution of profile and demographic characteristics of telecommunication service subscribers who have downloaded the mobile applications from the mobile application downloading site,
   transmits the first report to an operator of the mobile application downloading site,
   generates a second report that includes information about a mobile application hosted for distribution by the mobile application downloading site and anonymizes the telecommunication service subscribers' identities based on the information collected and the accessed profile and demographic information, wherein the second report comprises information on a distribution of profile and demographic characteristics of telecommunication service subscribers who have downloaded the mobile application from the mobile application downloading site, and
   transmits the second report to a mobile application developer of the mobile application,
   wherein the gateway computer system transmits the data packets received from the RAN to destination hosts identified in the data packets.

2. The gateway computer system of claim 1, wherein the probe application decrypts some of the data packets using a secure socket layer (SSL) certificate.

3. The gateway computer system of claim 2, wherein the probe application stores SSL certificates for a plurality of mobile application distribution systems.

4. The gateway computer system of claim 1, wherein the RAN supports wireless communication in accordance with a long term evolution (LTE), a code division multiple access (CDMA), a global system for mobile communications (GSM), or a worldwide interoperability for microwave access (WiMAX) telecommunications wireless protocol.

5. A method of reporting mobile application downloading information, comprising:
   monitoring data packets received from a radio access network (RAN) by a probe application executing on a telecommunications service provider gateway;
   parsing an address included in each of the data packets by the probe application;
   determining whether the address included in each of the data packets matches an address of a server computer included on a white list of server computers hosting mobile application downloading sites by the probe application;
   identifying hypertext transport protocol secure (HTTPS) packets among the monitored data packets that are addressed to a server computer hosting a mobile application downloading site by the probe application in response to determining that the address of the server computer is included on the white list;
decrypting the HTTPS packets based on a secure socket layer (SSL) certificate stored at the gateway;
in response to the determining that the address of the server computer is included on the white list:
   determining by the probe application identities of telecommunication service subscribers associated with mobile communication devices that originated the HTTPS packets addressed to the server computer hosting the mobile application downloading site;
   determining by the probe application identities of mobile applications being requested for download in the HTTPS packets by reading the content of the HTTPS packets;
   for the HTTPS packets, collecting by the probe application information including the determined identities of the telecommunication service subscribers and the identities of the mobile applications being requested for download;
   accessing by the probe application profile and demographic information about the telecommunications service subscribers from a profile and demographic data store based on the identities of the telecommunication service subscribers; and
   storing by the probe application the information collected and the accessed profile and demographic information as associated to the mobile application downloading site in a data store;
generating a first report based on the information collected and the accessed profile and demographic information that anonymizes the telecommunication service subscribers' identities, wherein the first report comprises information on a distribution of profile and demographic characteristics of telecommunication service subscribers who have downloaded mobile applications from the mobile application downloading site;
transmitting the first report to an operator of the downloading site;
generating a second report that includes information about a mobile application hosted for distribution by the mobile application downloading site and anonymizes the telecommunication service subscribers' identities based on the information collected and the accessed profile and demographic information, wherein the second report comprises information on a distribution of profile and demographic characteristics of telecommunication service subscribers who have downloaded the mobile application from the mobile application downloading site;
transmitting the second report to a mobile application developer of the mobile application; and
transmitting by the gateway the data packets received from the RAN on to destination hosts identified in the data packets.

6. The method of claim 5, wherein the RAN supports wireless communication in accordance with a long term evolution (LTE), a code division multiple access (CDMA), a global system for mobile communications (GSM), or a worldwide interoperability for microwave access (WiMAX) telecommunications wireless protocol.

7. The method of claim 5, wherein the profile information comprises information about on-line purchases, mobile application usage patterns, travel patterns, or communication patterns.

8. The method of claim 5, wherein the demographic information comprises information about age, gender, educational level, or income level.

9. A method of reporting mobile application downloading information, comprising:
   monitoring data packets received from a radio access network (RAN) by a probe application executing on a telecommunications service provider gateway;
   parsing an address included in each of the data packets by the probe application;
   determining whether the address included in each of the data packets matches an address of a server computer included on a white list of server computers hosting mobile application downloading sites by the probe application;
   identifying data packets addressed to a server computer hosting a mobile application downloading site by the probe application in response to determining that the address of the server computer is included on the white list;
   in response to determining that the address of the server computer is included on the white list:
      determining by the probe application identities of telecommunication service subscribers associated with mobile communication devices that originated the HTTPS packets addressed to the server computer hosting the mobile application downloading site;
      determining by the probe application identities of mobile applications being requested for download in the HTTPS packets by reading the content of the HTTPS packets;
      for the data packets addressed to the mobile application downloading site, collecting by the probe application information including the determined identities of the telecommunication service subscribers and the identities of the mobile applications being requested for download;
      accessing by the probe application profile and demographic information about the telecommunications service subscribers from a profile and demographic data store based on the identities of the telecommunication service subscribers; and
      storing by the probe application the information collected and the accessed profile and demographic information as associated to the mobile application downloading site in a data store;
   generating a first report based on the information collected and the accessed profile and demographic information that anonymizes the telecommunication service subscribers' identities, wherein the first report comprises information on a distribution of profile and demographic characteristics of telecommunication service subscribers who have downloaded mobile applications from the mobile application downloading site;
   transmitting the first report an operator of the mobile application downloading site;
   generating a second report that includes information about a mobile application hosted for distribution by the mobile application downloading site and anonymizes the telecommunication service subscribers' identities based on the information collected and the accessed profile and demographic information, wherein the second report comprises information on a distribution of profile and demographic characteristics of telecommunication service subscribers who have downloaded the mobile application from the mobile application downloading site;

transmitting the second report to a mobile application developer of the mobile application; and transmitting by the gateway the data packets received from the RAN on to destination hosts identified in the data packets.

10. The gateway computer system of claim 1, wherein the probe application when executed by the processor further:

identifies a second plurality of data packets addressed to a second server computer hosting a second mobile application downloading site in response to determining that the address of the second server computer is included on the white list, in response to determining that the address of the second server computer is included on the white list:

determines identities of a second plurality of telecommunication service subscribers associated with mobile communication devices that originated the data packets addressed to the second server computer hosting the second mobile application downloading site and determines identities of mobile applications being requested for download from the second mobile application downloading site in the second plurality of data packets by reading the content of the second plurality of data packets, for the second plurality of data packets addressed to the second mobile application downloading site, collects information including the determined identities of the second plurality of telecommunication service subscribers and the identities of the mobile applications being requested for download from the second mobile application downloading site, accesses profile and demographic information about the second plurality of telecommunications service subscribers from a profile and demographic data store based on the identities of the second plurality of telecommunication service subscribers, and stores the information collected and the accessed profile and demographic information associated with the second plurality of telecommunications service subscribers as associated to the second mobile application downloading site in the data store, wherein the second report further includes information about a second mobile application associated with the mobile application developer and hosted for distribution by the second mobile application downloading site, wherein the second report is further generated based on the information collected and the accessed profile and demographic information associated with the second plurality of telecommunications service subscribers, and wherein the second report further comprises information on a distribution of profile and demographic characteristics of telecommunication service subscribers who have downloaded the second mobile application from the second mobile application downloading site.

* * * * *